US010121254B2

(12) United States Patent
Wang et al.

(10) Patent No.: US 10,121,254 B2
(45) Date of Patent: Nov. 6, 2018

(54) METHODS AND SYSTEMS OF DETECTING OBJECT BOUNDARIES (71) Applicant: Disney Enterprises, Inc., Burbank, CA (US)

(72) Inventors: Oliver Wang, Zurich (CH); Aljosa Smolic, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 633 days.

(21) Appl. No.: 14/014,077

(22) Filed: Aug. 29, 2013

(65) Prior Publication Data
US 2015/0063709 A1  Mar. 5, 2015

(51) Int. Cl.
*G09G 5/00* (2006.01)
*G06T 7/12* (2017.01)
*G06T 7/174* (2017.01)
*G06T 7/215* (2017.01)

(52) U.S. Cl.
CPC ............... *G06T 7/12* (2017.01); *G06T 7/174* (2017.01); *G06T 7/215* (2017.01); *G06T 2207/10016* (2013.01); *G06T 2207/20021* (2013.01)

(58) Field of Classification Search
CPC ......... G06T 2207/10024; G06T 7/0083; G06T 7/0087; G06T 7/0089; G06T 7/0079; G06T 7/20
USPC .................................................. 382/103, 199
See application file for complete search history.

(56) References Cited

U.S. PATENT DOCUMENTS

| 6,061,100 | A | * | 5/2000 | Ward ...................... H04N 5/21 348/607 |
| 6,335,985 | B1 | | 1/2002 | Sambonsugi et al. |
| 6,349,113 | B1 | | 2/2002 | Mech et al. |
| 6,724,915 | B1 | | 4/2004 | Toklu et al. |
| 6,757,434 | B2 | | 6/2004 | Miled et al. |
| 7,221,775 | B2 | | 5/2007 | Buehler |

(Continued)

FOREIGN PATENT DOCUMENTS

| EP | 0921686 A1 * | 6/1999 | ............. H04N 19/99 |
| EP | 2549437 A2 | 1/2013 | |

(Continued)

OTHER PUBLICATIONS

Kwai Hung Chan, Rynson W.H. Lau, Contour-Based Warping, CVGIP: Graphical Models and Image Processing, Academic Press, 60(5), pp. 331-348, Sep. 1998.*

*Primary Examiner* — Weiming He
(74) *Attorney, Agent, or Firm* — Sheppard Mullin Richter & Hampton LLP (57) ABSTRACT

Methods and systems described herein detect object boundaries of videos. A window around the pixel may be followed in adjacent image frames of the image frame to determine object boundaries. Inconsistencies in image patches over a temporal window are detected, and each pixel of the image frame of a video is assigned an object boundary probability. The pixel may belong to a texture edge if the window content does not change throughout the adjacent image frames, or the pixel may belong to an object boundary if the window content changes. A probability value indicating the likelihood of the pixel belonging to an object boundary is determined based on the window content change and is assigned to the corresponding pixel.

20 Claims, 5 Drawing Sheets
(3 of 5 Drawing Sheet(s) Filed in Color)

(56) References Cited

U.S. PATENT DOCUMENTS

| | | |
|---|---|---|
| 7,454,058 B2 | 11/2008 | Porikli |
| 7,609,888 B2 | 10/2009 | Sun et al. |
| 8,363,728 B2 | 1/2013 | Zhang et al. |
| 8,374,388 B2 | 2/2013 | Stolkin et al. |
| 2009/0315978 A1 | 12/2009 | Wurmlin et al. |
| 2010/0104202 A1* | 4/2010 | Chen ............... H04N 5/21 382/218 |
| 2011/0150284 A1 | 6/2011 | Son et al. |
| 2012/0308086 A1 | 12/2012 | Atsmon et al. |
| 2013/0129213 A1* | 5/2013 | Shechtman ......... G06T 7/0028 382/167 |
| 2014/0064567 A1* | 3/2014 | Kim ............... G06T 7/2086 382/107 |
| 2014/0093169 A1* | 4/2014 | Kim ............... G06T 7/0081 382/173 |
| 2014/0146997 A1* | 5/2014 | Chang ............. G06T 7/208 382/103 |
| 2014/0270487 A1* | 9/2014 | Park ............... G06T 5/003 382/155 |

FOREIGN PATENT DOCUMENTS

| | | | | |
|---|---|---|---|---|
| KR | 1020120094954 | * | 8/2012 | ............ G06T 7/20 |
| KR | 20140042521 A | * | 4/2014 | ......... G06T 7/0081 |
| WO | 2000018128 A1 | | 3/2000 | |

* cited by examiner

METHODS AND SYSTEMS OF DETECTING OBJECT BOUNDARIES

TECHNICAL FIELD

The present application relates generally to computer vision and image processing and analysis, more particularly, some embodiments relate to methods and systems of detecting object boundaries in videos.

DESCRIPTION OF THE RELATED ART

Edges are basic information in visual perception and an important factor for image processing. Consequently, many applications benefit from a differentiation between object contour edges and texture edges. Most of these applications use a notion of image edge strength to approximate object boundaries in scenes. However, this approximation does not distinguish between actual object boundaries and texture edges. This uncertainty is also a fundamental constraint in most of today's image-based methods.

Edge detection refers to mathematical methods that aim at identifying points in a digital image at which the image brightness changes sharply or, more formally, has discontinuities. The points at which image brightness changes sharply are typically organized into curved line segments termed edges. Existing edge detection algorithms still remain difficult to divide the set of detected edges into object contours and texture edges. This complicacy may be partially due to the fact that the edge type cannot be guessed from the edge strength: strong gradients might belong to texture edges whereas object contours can have weak gradients. Efficient algorithms exist to detect texture edges based on some texture statistics, but many texture edges are non-repetitive (e.g., writing on a packaging or the veins of a leaf).

Detection may become even more challenging as there is no clear definition of what an object contour is and what a texture edge is. Depending on the circumstances, a contour edge may switch to a texture edge, or vice versa. For example, a scene and an image of the scene may appear the same to a user, but the edges in the scene itself are depth edges whereas the edges in the image are texture edges. Clearly, more information must be used to differentiate between different types of edges.

BRIEF SUMMARY OF THE APPLICATION

According to various embodiments of the application, methods and systems described herein detect inconsistencies in image patches over a temporal window to assign object contour probabilities to a pixel. A window around a tracked point may be followed in adjacent image frames of a video to determine object boundaries. The tracked point may belong to a texture edge if the window content does not change throughout the adjacent image frames, or the tracked point may belong to an object boundary if the window content changes.

In various embodiments, for each pixel of each image frame of a video, a patch is defined. The patch may be a square of which the center is the corresponding pixel. In addition, a set of image frames are identified for the image frame corresponding to the pixel. The set of image frames may be identified by a temporal window size. A set of patch matches from the set of image frames may be recognized according to the content of the patch. Consequently, an object boundary probability value for the pixel may be calculated based on the patch and the set of patch matches identified. A probability map for the image frame comprises the probability values for all the pixels of the image frame of a video. As such, object boundaries and texture edges may be detected for the image frame.

The object boundary probability value may be determined differently in various embodiments. For example, the mean of error, the k-means clustering, the bimodality, the color histogram comparison, the cross-correlation, or the supervised learning algorithm may be used. Furthermore, a probability map for an image frame may be refined by a confidence map.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

As described herein, texture edges refer to edges moving together with an object, wherein the edges are not on the outline of the object. Conventional edge detection methods (e.g., Prewitt operator, Sobel operator, the Canny edge detector, Marr-Hildred algorithm) focus on locally finding maxima in the first derivative or zero-crossings in the second derivative of the image signal. These methods detect most edges in images and assign a magnitude to them. However, the edge strength depends on the gradient rather than edge type. As a result, the edge maps do not differentiate between object boundaries and texture edges.

Figure 1:
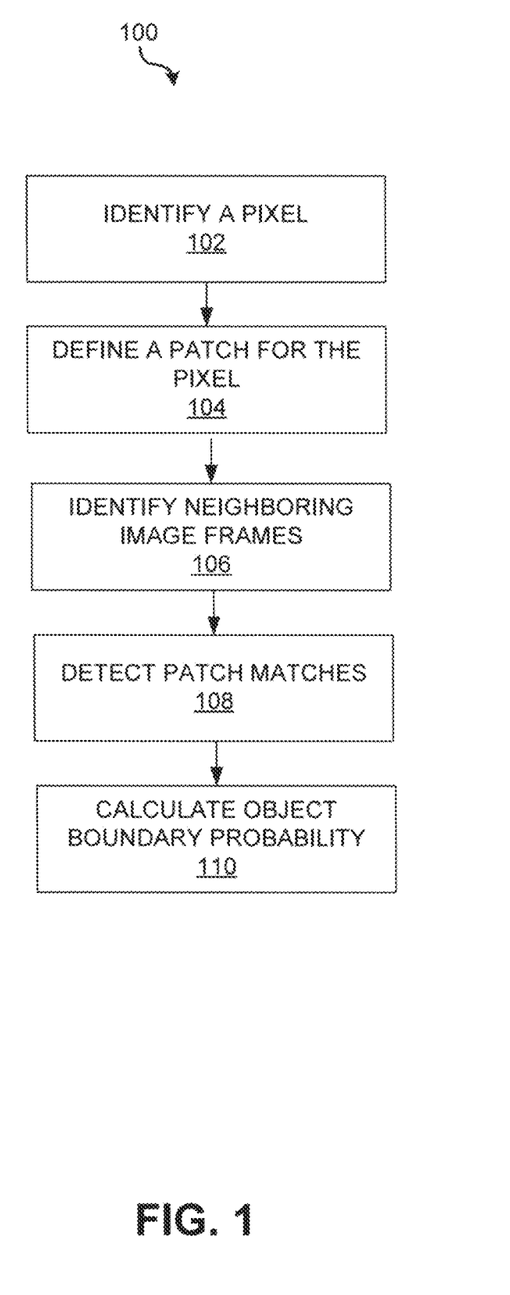
FIG. 1 is a flow diagram illustrating an exemplary method of detecting an object boundary.

FIG. 1 is a flow diagram illustrating an exemplary method 100 of detecting an object boundary. A video may be received from a video source such as a camera, a video storage, a video player, a video editing tool, or other similar devices. The video received may be processed by various embodiments of the systems and methods described herein. For a video, a likelihood of a pixel of an image frame corresponding to an object boundary (i.e., $P \in \mathbb{R}^2$ for each pixel) may be determined. At step 102, a pixel is identified from an image frame j of a video. Subsequently, at step 104, a patch i, that is a two-dimensional ("2D") image region, is defined for the identified pixel. For a pixel, the patch i may be a rotated and scaled square, of which the center is the pixel. Accordingly, $I_i^j$ refers to the content (i.e., pixels) included in a patch i of an image frame j. In various embodiments, a patch i is configured to have a size of 15×15 pixels.

For the image frame j corresponding to the pixel, at step 106, a set of neighboring image frames K excluding the frame j is identified. In various embodiments, K={j−n,. . . ,j+n}, where n is the temporal window width. In various embodiments, the temporal window width n is two (2). Subsequently, at step 108, a set of patch matches to the patch i at the image frame j may be detected. A patch match to a patch may be detected by comparing the content (i.e., all the pixels included) of a patch to the content of the patch that is being matched. When the difference between the content of the two patches is identified to be less than a predetermined value, the patch is determined to be a patch match (e.g., the closest patch match) to the patch that is being matched. The closest patch match $b_k$ to a patch i may be determined by searching all patches $b_k \in \mathbb{R}^4$ over a set of patch transformations. That is, a search may be performed based on the patch content $I_i^j$ for each patch i. The search may result in identifying the closest set of patch matches $b_k$ having the content $I_{b_k}^k$ from each frame of the neighboring frames $k \in K=\{j-n,\ldots,j+n\}$ excluding the image frame j.

The search step may be further improved by extending the search space to rotation and scale, and/or finding non-rigid dense correspondences removing unreliable matches and extending the search space to illumination changes by adding a gain and bias term. In some embodiments, $I_{b_k}^k$ may be warped and resampled into the image frame j corresponding to the patch i because the patch $b_k$ may not necessarily be rectangular in a neighboring image frame. As such, $I_i^j$ and $I_{b_k}^k$ may be compared by performing direct pixel-to-pixel comparison. In one embodiment, the patch i is configured to have a fixed scale (i.e., s=1), and a fixed rotation (i.e., θ=0).

In various embodiments, a function $f_{patchmatch}: \mathbb{R}^2 \to \mathbb{R}^4$ may be defined to identify a set of patch matches $b_k$ to the patch i at the image frame j. The function $f_{patchmatch}(I_i^j,I^k)$ may be the four-element offset vector that gives the position, scale, and rotation offsets from a patch i at the image frame j to its nearest neighbor patch $b_k$. Exemplary patch transformations may include a shift (x, y), a relative scale (s), or a rotation (θ). In one embodiment, for images with m pixels, patches of size M, and |s| and |θ| are the cardinalities of the discretized scale space and rotation space, respectively, the running time for the brute force solution to process the $f_{patchmatch}$ function may be determined as $O(mM^2|s||θ|)$.

In some embodiments, the determination may be accelerated by performing a propagation step and a random search step. First, the nearest neighboring field which represents a current estimate of best patch matches for all pixels, may be randomly initialized. As images have spatial coherence, every patch match may be sequentially (e.g., from top to bottom, or from left to right) updated with the best match of itself and of neighboring patches. Second, a number of random patch matches may be examined to verify whether one or more could provide a better matching than the current estimate. The two steps may be alternated for a fixed number of iterations (e.g., five iterations).

Step 110 entails calculating an object boundary probability value $p_i^j$ for each patch i of an image frame j. A probability map P refers to the probabilities $p_i^j$ assembled into an image. The object boundary probability value $p_i^j$ for each patch i may be defined as a function of the set of patch matches $p_i^j = \phi(I_i^j, I_{b_k}^k, \ldots)$, where k ∈K. The metric φ may distinguish a set of patches corresponding to texture edges from those corresponding to object boundaries. Because patches are similar if the content corresponds to a texture edge, the difference metric φ may be defined as Equation (1) that combines color and gradient information:

$$\phi(I_i^j, I_{b_k}^k, \ldots) = \frac{1}{|K|} \sum_{k \in K} \|I_i^j - I_{b_k}^k\| + \alpha \|\nabla I_i^j - \nabla I_{b_k}^k\|, \qquad (1)$$

where ∇ is the gradient operator. The difference metric φ as illustrated in Equation (1) may have good discriminative properties as well as some degree of invariance to lighting changes due to the gradient term. In various embodiments, a value of α=0.5 is used to provide equal weighting to the color and gradient information. The set of patches $b_k$ may be configured to have different sizes. The bigger the patches, the blurrier the probability map P may appear. Smaller patches may provide a sharper probability map P, but may become sensitive to noises and provide less reliable information. In one embodiment, the set of patches $b_k$ is configured to have a size of 15×15 pixels.

The probability map may be determined from the information contained in matched patches differently. In one embodiment, the mean of error method is used. A pixel-wise absolute color difference between each two matched patches is determined and summed over all color channels. These differences may be stored in a two-dimensional error patch. A mean error patch $\bar{p}$ may be defined in Equation (2):

$$\bar{p} = \sum_{i=1}^{N} \frac{b_i}{N}, \qquad (2)$$

where N is the total number of fields in the error patch and $b_i$ is the value of the $i^{th}$ field. The mean of the error patch (i.e., the sum of all the values divided by the number of fields) is low (e.g., close to zero) for a texture or uniform patch and high for an object edge patch. If the match is exact (i.e., the patch a from the first frame equals to the patch b from the second frame), the error is zero (or close to zero when taking into account of small noise) at each pixel in the error patch. If the patches a and b differ because the patches lie on an object edge, the error patch may, at some pixel positions, have high values due to the high difference resulting from the pixel-to-pixel comparison between the two patches.

In one embodiment, the k-means clustering method is used. The k-means clustering method also determines a pixel-wise absolute color difference between each two matched patches summed over all channels and stores these differences in a two-dimensional error patch. The two-dimensional error patch may show two patterns: 1) low or no errors in regions with the same or similar matches, and 2) high errors in regions with no matches, or vice versa. Two cluster centers (k=2) may be used to group the data in the error patch into a high-error region and a low-error region based on the error strength and location. Respective mean error strength for each cluster is calculated. Three possible cases may be distinguished: 1) if the error is based on noise, the values are randomly distributed over the histogram and the clusters' mean values are close together; 2) if the error is based on small illumination changes, the error is constant and the clusters' mean values may also have similar values; and 3) if the patch is a boundary patch, the difference between the clusters' mean values is high. Accordingly, only the patches on contours are assigned with a high value.

In some embodiments, the bimodality method may be used. The bimodality approach is based on error patches and is location independent. Data contained in the error patches close to object boundaries may be bimodal. That is, the data may have an important amount of high error values but also a considerable number of low error values. The bimodality coefficient may be used as an object edge probability score in a contour probability map because the bimodality coefficient is within the range of [0,1]. A score that is close to one (1) denotes that the data is bimodal. For every patch around each pixel, the bimodality of the pixel-wise patch errors are stored in an probability map P. In one embodiment, Sarle's bimodality coefficient b may be determined using the third and fourth moment for N data points as defined in Equation (3):

$$b = \frac{1 + m_3^2}{m_4} \quad (3)$$

where $m_3$ is the skewness (i.e., $$m_3 = \frac{\sum_{i=1}^{N}(x_i - \bar{x})^3}{(N-1)s^3}),$$

$m_4$ is the kurtosis (i.e., $$m_4 = \frac{\sum_{i=1}^{N}(x_i - \bar{x})^4}{(N-1)s^4}),$$

$\bar{x}$ is the mean value of the data, and s is the standard deviation.

In further embodiments, the edge probability map may be determined by comparing the color content of the matched patches using histogram comparison. Such comparison is location independent and thus is less sensible to small patch mismatches. If the patches are similar (i.e., in the case of texture edge or background patches even with small displacements), the color histograms of both patches are equal or very similar. On the contrary, the color histograms are different. The more different the color histograms are, the more probable it is that they belong to an object edge patch. The distance may be measured by histogram correlation, $\chi^2$-distance, histogram intersection, or Bhattacharyya distance. The distance for each color channel is calculated separately and the mean distance of all color channels is stored in the probability map P.

The histogram correlation between two histograms $H_1$ and $H_2$ with N bins may be defined as Equation (4):

$$d(H_1, H_2) = \frac{\sum_I (H_1(I) - \bar{H}_1)(H_2(I) - \bar{H}_2)}{\sqrt{\sum_I (H_1(I) - \bar{H}_1)^2 \sum_I (H_2(I) - \bar{H}_2)^2}}, \quad (4)$$

where $\bar{H}_k = \frac{1}{N}\sum_J H_k(J)$.

The same patches may have a histogram correlation of 1, whereas completely different patches may have a correlation of 0. The histogram correlation may be subtracted from 1 to create an object edge probability map.

The $\chi^2$-distance is defined as so in Equation (5):

$$d(H_1, H_2) = \sum_I \frac{(H_1(I) - H_2(I))^2}{H_1(I)}. \quad (5)$$

Two similar histograms may have a low $\chi^2$-distance whereas very different histograms may have a high $\chi^2$-distance. The distance values may be scaled uniformly with a threshold of one (1) in an object edge probability map.

The histogram intersection may be defined as shown in Equation (6):

$$d(H_1, H_2) = \sum_I \min(H_1(I), H_2(I)). \quad (6)$$

The histogram intersection distance may be high for similar patches and low for different patches. The resulting distance may be scaled to [0,1] and the scaled distances may be subtracted from 1 to determine create an object edge probability map.

The Bhattacharyya distance may be defined according to Equation (7):

$$d(H_1, H_2) = \sqrt{1 - \frac{1}{\sqrt{\bar{H}_1 \bar{H}_2 N^2}} \sum_I \sqrt{H_1(I) \cdot H_2(I)}}. \quad (7)$$

The values of Bhattacharyya distance may be a value between zero (0) and (1). The value zero (0) indicates the histograms being compared are the same whereas the value one (1) denotes the histograms are different. A Bhattacharyya distance value may be used directly as an object edge probability.

In one embodiment, the similarity of the matched patches may be measured by the cross-correlation method. The normalized cross-correlation between two patches of equal size is defined as in Equation (8):

$$R(x, y) = \frac{\sum_{x,y}(T(x, y) \cdot I(x, y))}{\sqrt{\sum_{x,y} T(x, y)^2 \cdot \sum_{x,y} I(x, y)^2}}. \quad (8)$$

Two identical patches may have a cross-correlation score of one (1) whereas two entirely different patches may result in a value of zero (0). As such, different types of patches (e.g., texture edge, background, object contour) may be differentiated. The object contour edge probability map may be determined as 1−R(x, y).

Furthermore, supervised learning that learns a classifier (i.e., a decision function to classify data based on a set of labeled training data) may be used. The SVM may be trained as a binary classifier to classify the patches as either an "object edge patch" or a "non-object edge patch". An edge probability map where the values are the distance to the margin may be subsequently determined. In some embodiments, the Radial-Basis-Function (RBF) may be used as kernel to provide the SVM to select the remaining parameters. Cross-validation that partitions a training data set into several subsets and iteratively uses one of the subset for training and the remaining subsets for testing may be used when selecting the remaining parameters. The difference patch may be transformed by using the fast Haar transform and the image patches may be classified by using the highest coefficients when using a SVM.

Figure 2:
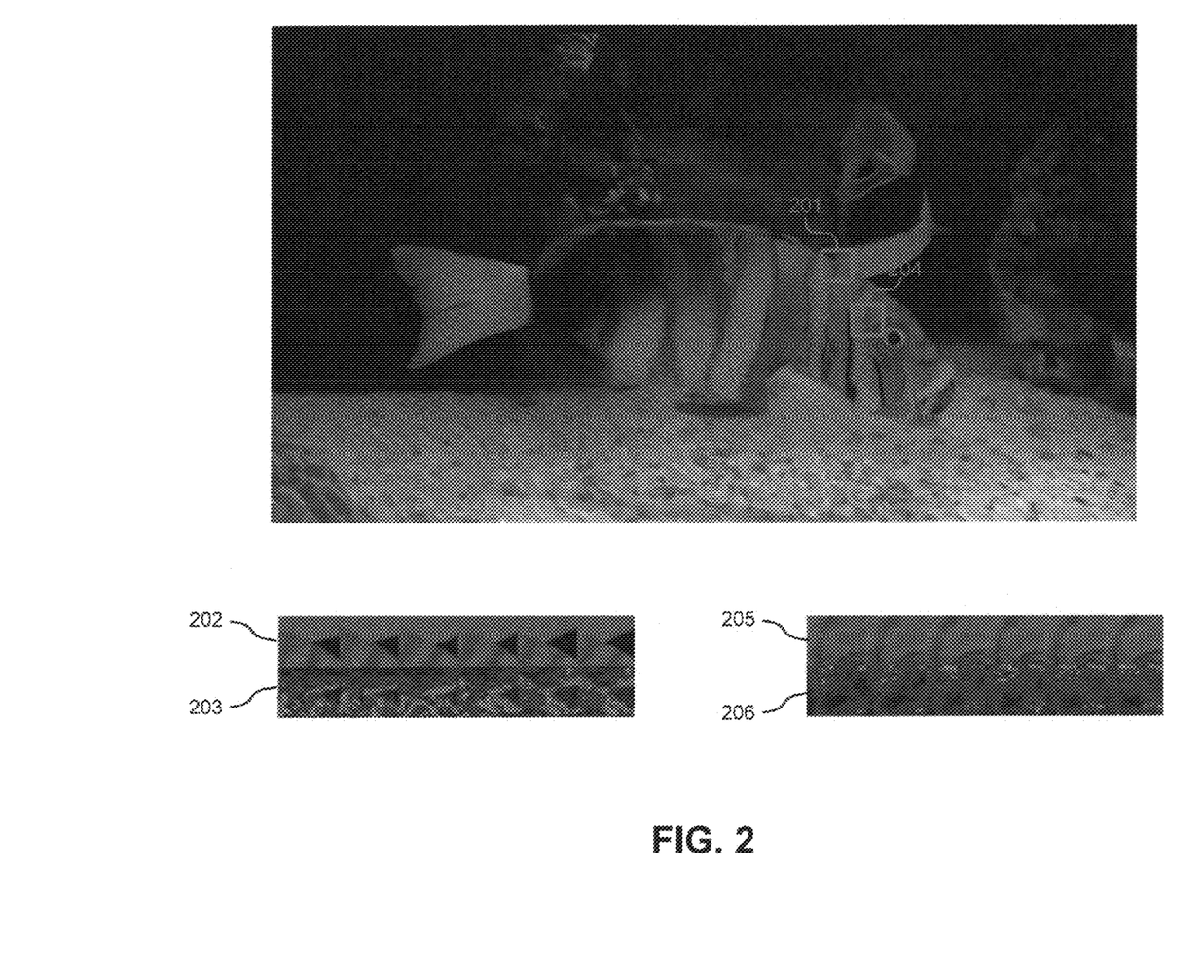
FIG. 2 illustrates exemplary best matched patches as well as the patch consistency to a patch of an image frame over a temporal window.

FIG. 2 illustrates exemplary best matched patches 202 and 205 as well as the patch consistency 203 and 206 to the patches 201 and 203, respectively, over a temporal window. The patches 201 and 203 are patches of an image frame 200. Patches that correspond to texture edges may be modeled within a short time-frame, whereas patches on object boundaries cannot be modeled by simple patch transformations over time. In the illustrated example, the best matched patches in a temporal window 202 correspond to the patch 201, and the best matched patches in a temporal window 205 correspond to the patch 204. A visualization of patch consistency over time 203 and 206 illustrate areas with different consistencies, of which the color blue denotes a high consistency, the color green denotes a medium consistency, and the color red denotes a low consistency. The patch consistency over time 206 that corresponds to the patch 204 presents more blue color whereas the patch consistency over time 203 that corresponds to the patch 201 presents more red and green colors. Accordingly, the patch 204 exhibits a higher patch consistency and thus corresponds to a texture edge, and whereas the patch 201 exhibits a lower patch consistency and thus corresponds to an object boundary.

In various embodiments, edge probabilities $p_i^j$ may be modulated to obtain an edge map P. Such modulation may be performed by multiplying the probability map P with an edge map generated using an edge detector. In one embodiment, the edge detector is the Sobel operator. The Sobel operator approximates the intensity gradient of the image signal and an edge may be determined by convolving the image with two 3×3 Sobel kernels. The multiplication with the probability map P results in a weighted edge map with one-pixel wide edges, of which intensities are a probability for object contour edges. A texture map m may be optimized to an enhanced map m' by three parameters using the equation (9):

$$m' = \operatorname{Max}(\min(\alpha \cdot m^\beta + \gamma, 1), 0) \quad (9),$$

where the parameter $\alpha$ increases the probabilities, $\beta$ accentuates the gap between high and low values by increasing high probabilities and lowering low values, and $\gamma$ shifts all values. Changing one or more of the parameters may modify the difference between object contour regions and texture edge regions. The probability map may be adapted according to a user's need, for example, the texture edges can be inhibited or totally removed by shifting the values such that they are set to zero. The edge strength of the Sobel map may be limited to a maximum value such that the edges are more pronounced in Equation (10):

$$m'_{sobel} = \frac{\min(m_{sobel}, \sigma)}{\sigma}, \quad (10)$$

where $m_{sobel}$ is the Sobel filtered image, and $\sigma$ is the maximal edge strength to which the Sobel map should be limited. The parameter $\sigma$ is within the range of [0 1] excluding the value zero (0).

In further embodiments, the object boundary probability P may be refined by using a confidence map C. The confidence map C may be used to determine a new object boundary probability map $\tilde{P}$, in which low confidence regions may use information from neighboring regions having high confidence. As such, the result is refined to image edges. The confidence map C may be determined as Equation (11):

$$C_i = \frac{1}{|K|} \sum_{k \in K} \min(\|i(x,y) - b_k(x,y)\|, \tau) + \operatorname{var}(I_i^j), \quad (11)$$

where i and $b_k$ are four-element vectors defining a patch, and i(x,y) and $b_k$(x,y) are only the translation components of each. The norm of their difference provides the image-space motion between frames, and var($I_i^j$) calculates the variance of the source patch. The constant $\tau$ may be used to avoid biasing a confidence map C to only the largest motions. In various embodiments, $\tau$ is set to three (3) such that some degree of motion is still detectable by the difference metric $\varphi$.

A quadratic energy term $E_{refined}$ may be defined in Equation (12):

$$E_{refined} = (P - \tilde{P})^T G(P - \tilde{P}) + \lambda \tilde{P}^T L \tilde{P} \quad (12)$$

where G is a diagonal 1×1 matrix of which only non-zero entries are $G_{ii} = C_i$, L is the Matting Laplacian, and $\lambda$ is a regularization parameter. The confidence weighted data term $(P - \tilde{P})^T (P - \tilde{P})$ preserves the similarity of the refined map $\tilde{P}$ to the original P in regions where the confidence C is high. The elements of L are derived from the classic edge strength map S, calculated as the magnitude of the Sobel response of image I'. The smoothness term $\tilde{P}^T L \tilde{P}$ forces neighboring values in $\tilde{P}$ to be similar only if they are also similar in S. By combining these two terms, an optimal $\tilde{P}$ may have values that are similar to the original estimates P, but have been propagated along image edges in regions of low confidence. The optimal refined probability map $\tilde{P}$ can be found by solving the equation (11):

$$(L + \lambda U)\tilde{P} = \lambda \tilde{P} \quad (11),$$

where $\tilde{P}$ denote the unknowns, and U is an identity matrix the same size as L.

Figure 3:
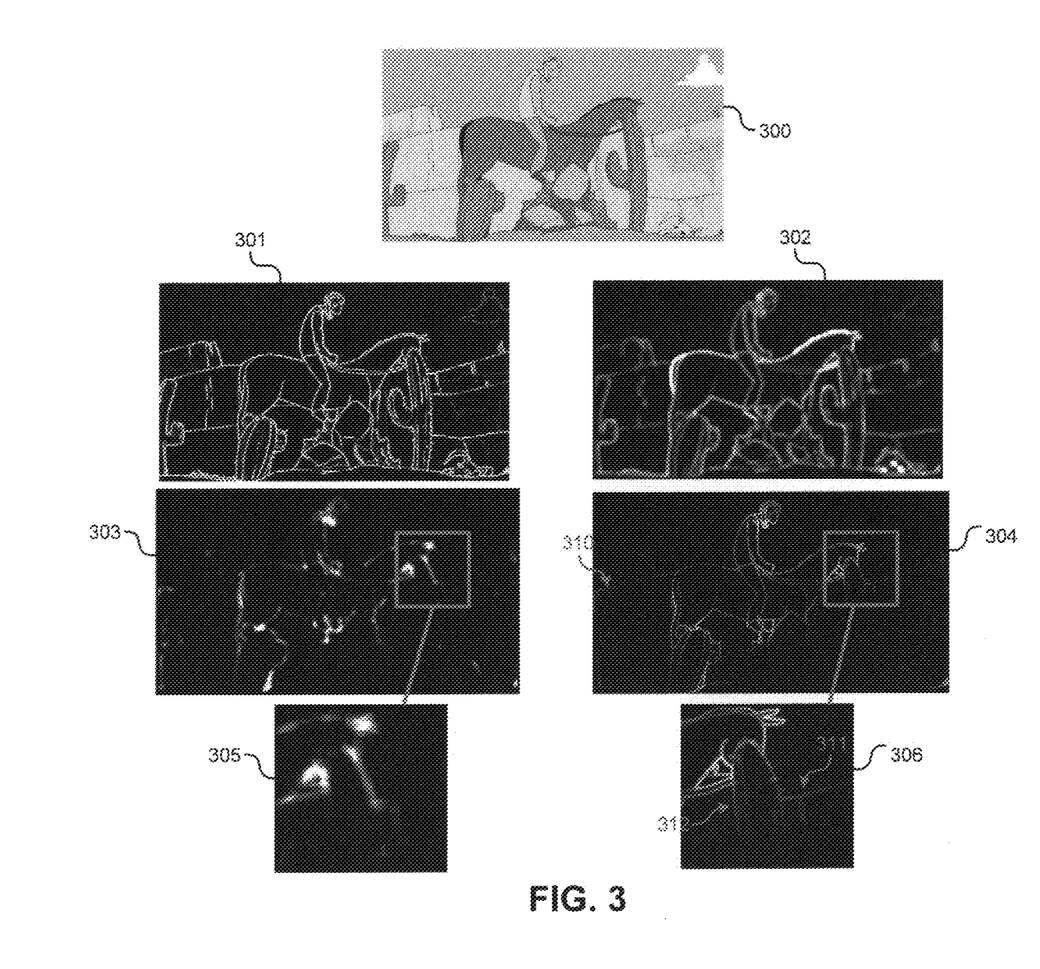
FIG. 3 illustrates an exemplary probability map and a refined probability map for an image frame.

FIG. 3 illustrates an exemplary probability map 303 and a refined probability map 304 for an image frame 300. In the illustrated example, the refined probability map $\tilde{P}$ 304 may be generated by refining the probability map P 303 using a Sobel response S 301 and a confidence map C 302. The probability map P 305 and the refined probability map $\tilde{P}$ 306 correspond to the same area of the image frame. This refinement may be driven by the confidence map C 302 and the original image edges S 301. The probability map P 303 may be aligned to image edges S 301 while gaps that arise due to textureless or static regions may be filled. As illustrated, high $\tilde{P}$ values are correlated to image edges, while the texture edges (e.g., the distant mountain lines 310-311, the cactus line 312) are suppressed.

Figure 4:
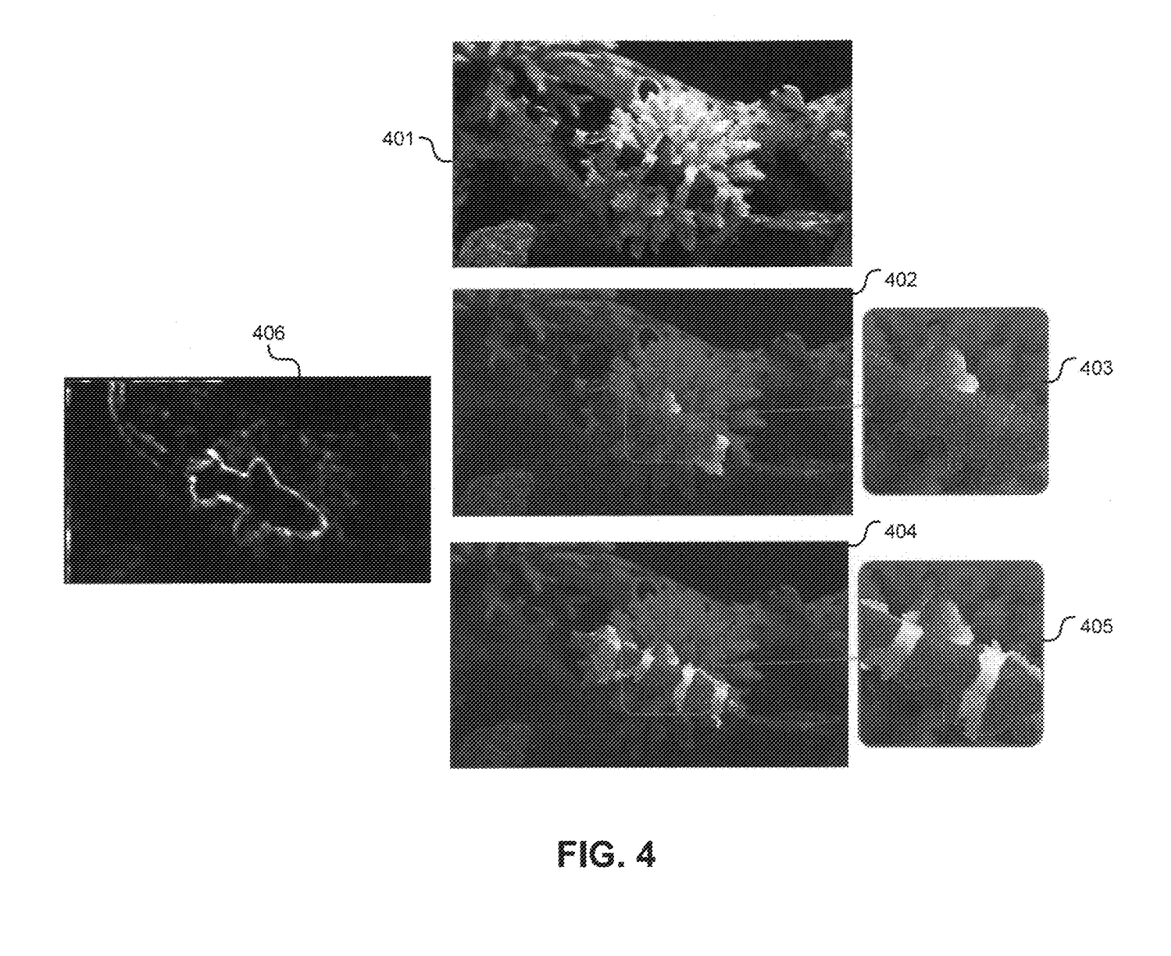
FIG. 4 illustrates exemplary graph cut image segmentations from a seed point.

FIG. 4 illustrates exemplary graph cut image segmentations 402-05 from a seed point 401. The image segmentation 402 is generated without using a refined object probability boundary map $\tilde{P}$ 406, whereas the image segmentation 404 is generated with the refined object boundary probability map $\tilde{P}$ 406. By using the refined object boundary probability map $\tilde{P}$, as illustrated, the body of the fish is more successfully isolated in the image segmentations 402-03 than that of the image segmentations 404-05.

A labeling l is found that assigns each pixel $i \in I^f$ a label $l_i$. A hard unary constraint may set the class labels for a sparse set of initial seeds, and a pairwise constraint enforces the labels to be similar between neighboring pixels. A refined probability map $\tilde{P}$ may be integrated into a graph cut image segmentation. The optimal labeling l may be determined by constructing a graph and by examining a pairwise smoothness terms according to the max-flow min-cut theorem. For example, considering an image I, the original pairwise term may be defined as Equation (12):

$$E_{pairwise} = \sum_{i \in I} \sum_{n \in N(i)} \rho(l_i, l_n) e^{-\|l_i - l_n\|}, \quad (12)$$

where N(i) are the four pixel neighbors of a patch i, and $\rho(l_i, l_n)$ is a comparison function. The comparison function $\rho(l_i, l_n)$ results in zero (0) when $l_i$ is the same as $l_n$ and in one (1) when $l_i$ differs from $l_n$. As such, an error may occur when neighboring pixels are assigned with a different label, and that is inversely related to the color similarity the two pixels. Further, the error may be weighed according to Equation (13):

$$E_{pairwise'} = \sum_{i \in I} (1 - \tilde{P}_i) \sum_{n \in N(i)} \rho(l_i, l_n) e^{-\|l_i - l_n\|}. \quad (13)$$

As such, the cost of assigning different labels to neighbors that are not at object edges is increased and the costs of assigning different labels to neighbors that are at texture edges is reduced.

In some embodiments, the refined probability map $\tilde{P}$ may be included in calculating an optical flow by minimizing the standard data-plus-smoothness term $E_{flow} = E_{data} + \lambda E_{smooth}$. A Non-local smoothness weighting where $\lambda = W \in \mathbb{R}^2$ is a spatially varying weight for each pixel. The modified edge map $\tilde{P}$ may be included into the weight map W to produce $\tilde{W}$, for example, $\tilde{W} = \tilde{P}_i W_i \forall i$. As such, the weight of the edge-based regularization term where color differences correspond to texture edges is increased to force the flow to be more similar, and is decreased at object boundaries to allow the flow to change.

Figure 5:
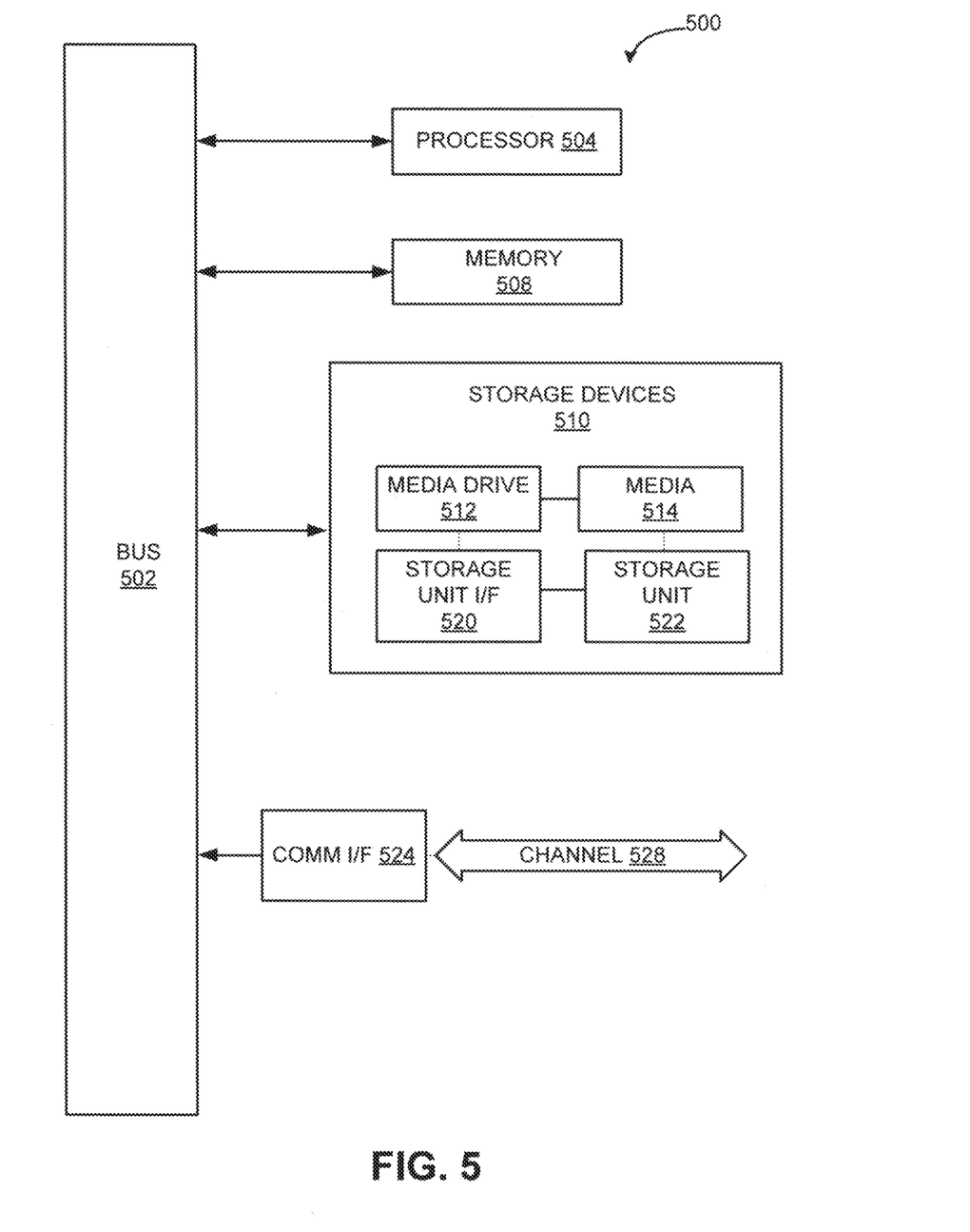
FIG. 5 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the application using other computing modules or architectures. Methods and systems described herein may comprise devices such as video processors, television sets, VCRs, DVDs, video codecs, video players, or video scalers may differentiate object boundaries from texture edges. The object boundaries detected may be used in many applications such as motion capture and feature flow.

Referring now to FIG. 5, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, an optical disk drive, a CD or DVD drive (R or RW), or other removable or fixed media drive might be provided. Accordingly, storage media 514 might include, for example, a hard disk, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present application as discussed herein.

While various embodiments of the present application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of detecting object boundaries in a video, comprising:
   identifying a pixel of an image frame of a video;
   defining a patch for the pixel;
   identifying a set of neighboring image frames for the image frame, the set of neighboring image frames comprising an image frame that comes before and an image frame that comes after the image frame in the video;
   detecting a set of patch matches to the patch from the set of neighboring image frames by searching a plurality of patch transformations of the patch in each image frame of the set of neighboring image frames, wherein each patch match of the set of patch matches is detected by comparing pixels of the patch with pixels of a patch that is being matched, wherein the set of patch matches comprises a patch match for each image frame of the set of neighboring image frames; and
   calculating an object boundary probability value for the patch corresponding to the pixel by applying a difference metric to the patch and the set of patch matches;
   wherein the difference metric distinguishes patches corresponding to texture edges from patches corresponding to object boundaries, wherein the difference metric is a function of the set of patch matches, and wherein the difference metric is based on color and gradient information of the patch and the set of patch matches.

2. The method of claim 1, further comprising:
   calculating a set of object boundary probability values for a set of patches, each patch of the set of patches corresponding to a pixel of all the pixels of the image frame; and
   determining a probability map for the image frame based on the set of object boundary probability values.

3. The method of claim 2, further comprising refining the probability map by using a confidence map to generate a refined probability map for the image frame.

4. The method of claim 1, wherein the patch is a region of the image frame.

5. The method of claim 1, wherein the patch is a rotated and scaled square.

6. The method of claim 1, wherein the set of neighboring image frames are identified based on a temporal window width.

7. The method of claim 1, wherein the plurality of patch transformations comprise a shift, a relative scale, and a rotation.

8. The method of claim 1, wherein a difference between each patch of the set of patch matches and the patch is less than a predetermined value.

9. The method of claim 1, further comprising warping and resampling a patch of the set of patch matches in the image frame corresponding to the patch such that a direct pixel-to-pixel comparison is performed.

10. The method of claim 1, wherein the patch is configured to have a fixed scale and a fixed rotation.

11. The method of claim 1, wherein the set of neighboring image frames comprise a plurality of image frames that come before and a plurality of image frames that come after the image frame in the video.

12. The method of claim 1, wherein calculating the object boundary probability value for the patch corresponding to the pixel comprises:
    calculating a pixel-wise absolute color difference between the patch and each patch match of the set of patch matches; and
    storing each difference in a two-dimensional error patch.

13. The method of claim 1, wherein detecting a set of patch matches comprises defining a vector that gives position, scale, and rotation offsets of the patch relative to a patch match.

14. A system of detecting object boundaries in a video, comprising:
    a non-transitory memory storing a set of instructions; and
    a processor coupled to the non-transitory memory, wherein the set of instructions are configured to cause the processor to perform:
       identifying a pixel of an image frame of a video;
       defining a patch for the pixel;
       identifying a set of neighboring image frames for the image frame, the set of neighboring image frames comprising an image frame that comes before and an image frame that comes after the image frame in the video;
       detecting a set of patch matches to the patch from the set of neighboring image frames by searching a plurality of patch transformations of the patch in each image frame of the set of neighboring image frames, wherein each patch match of the set of patch matches is detected by comparing pixels of the patch with pixels of a patch that is being matched, wherein the set of patch matches comprises a patch match for each image frame of the set of neighboring image frames; and
       calculating an object boundary probability value for the patch corresponding to the pixel by applying a difference metric to the patch and the set of patch matches;
       wherein the difference metric distinguishes patches corresponding to texture edges from patches corresponding to object boundaries, wherein the difference metric is a function of the set of patch matches, and wherein the difference metric is based on color and gradient information of the patch and the set of patch matches.

15. The system of claim 14, wherein the set of instructions are further configured to cause the processor to perform:
    calculating a set of object boundary probability values for a set of patches, each patch of the set of patches corresponding to a pixel of all the pixels of the image frame; and
    determining a probability map for the image frame based on the set of object boundary probability values.

16. The system of claim 15, wherein the set of instructions are further configured to cause the processor to perform using a confidence map to generate a refined probability map for the image frame.

17. The system of claim 14, wherein the set of neighboring image frames are identified based on a temporal window width.

18. The system of claim 14, wherein the plurality of patch transformations comprise a shift, a relative scale, and a rotation.

19. The system of claim 14, wherein the set of instructions are further configured to cause the processor to perform warping and resampling a patch of the set of patch matches in the image frame corresponding to the patch such that a direct pixel-to-pixel comparison is performed.

20. The system of claim 14, wherein the set of neighboring image frames comprise a plurality of image frames that come before and a plurality of image frames that come after the image frame in the video.

* * * * *